(12) United States Patent
Sjoberg et al.

(10) Patent No.: US 8,861,615 B2
(45) Date of Patent: Oct. 14, 2014

(54) PICTURE CODING AND DECODING

(75) Inventors: Rickard Sjoberg, Stockholm (SE); Clinton Priddle, Indooroopilly (AU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 372 days.

(21) Appl. No.: 13/144,359

(22) PCT Filed: Jun. 29, 2011

(86) PCT No.: PCT/SE2011/050874
§ 371 (c)(1),
(2), (4) Date: Nov. 9, 2011

(87) PCT Pub. No.: WO2012/011859
PCT Pub. Date: Jan. 26, 2012

(65) Prior Publication Data
US 2012/0140832 A1    Jun. 7, 2012

Related U.S. Application Data (60) Provisional application No. 61/366,215, filed on Jul. 21, 2010.

(51) Int. Cl.
| | |
|---|---|
| H04N 7/26 | (2006.01) |
| H04N 19/46 | (2014.01) |
| H04N 19/119 | (2014.01) |
| H04N 19/70 | (2014.01) |
| H04N 19/174 | (2014.01) |
| H04N 19/91 | (2014.01) |

(52) U.S. Cl.
CPC ... *H04N 19/00545* (2013.01); *H04N 19/00072* (2013.01); *H04N 19/00884* (2013.01); *H04N 19/00272* (2013.01); *H04N 19/00951* (2013.01)
USPC .................................................. 375/240.26

(58) Field of Classification Search
CPC ............. H04N 7/26; H04N 11/02; G06T 9/40
USPC ............ 375/240.12, E7.243, E7.027, 240.26, 375/240.02
See application file for complete search history.

(56) References Cited

U.S. PATENT DOCUMENTS 6,078,328 A * 6/2000 Schumann et al. ........... 345/418
6,651,252 B1 * 11/2003 Gordon et al. ................. 725/54
(Continued)

FOREIGN PATENT DOCUMENTS

WO   WO 2007/107170 A1   9/2007

OTHER PUBLICATIONS

International Search Report, PCT Application No. PCT/SE2011/050874, Dec. 12, 2011.
(Continued)

*Primary Examiner* — Jorge L Ortiz Criado
*Assistant Examiner* — Paul Myers, III
(74) *Attorney, Agent, or Firm* — Myers Bigel Sibley & Sajovec, P.A.

(57) ABSTRACT

A picture (1) with multiple slices (2-5) is encoded by determining a hierarchical granularity for the picture (1) defining a hierarchical level for slice border alignments. Address information allowing identification for a respective slice start is determined for at least a portion of the slices (2-5) based on the hierarchical granularity. The pixel values of the slices are encoded to generate coded slice representations (56). These coded slice representations (56) are included together with the address information into a coded picture representation (50) to which information of the hierarchical granularity is associated. The hierarchical granularity provides a flexible way of defining at which coding unit level slice borders can be present in the picture (1).

19 Claims, 5 Drawing Sheets

(56) References Cited

U.S. PATENT DOCUMENTS

2009/0125538 A1* 5/2009 Rosenzweig et al. .......... 707/101
2011/0274162 A1    11/2011 Zhou et al.
2012/0014441 A1* 1/2012 Segall et al. ............. 375/240.12

OTHER PUBLICATIONS

Written Opinion of the International Searching Authority, PCT Application No. PCT/SE2011/050874, Dec. 12, 2011.

Sjoberg et al., "CE4 Subset1: Ericsson fine granularity slices", 96. MPEG meeting; Mar. 21-25, 2011; Geneva; (Motion Picture Expert Group or ISO/IEC JTC1/SC29/WG11), Mar. 17, 2011; p. 346-351, ISBN 1-4577-0252-5.

Ugur et al., High Performance, Low Complexity Video Coding and the Emerging HEVC Standard:, IEEE Transactions on Circuits and Systems for Video Technology, Dec. 1, 2010, IEEE Service Center, Piscataway, NJ, p. 1688-1697, ISSN 1051-8215.

Han et al., "Improved Video Compression Efficiency Through Flexible Unit Representation and Corresponding Extension of Coding Tools", IEEE Transactions on Circuits and Systems for Video Technology, Dec. 1, 2010, IEEE Service Center, Piscataway, NJ, p. 1709-1720, ISSN 1051-8215.

* cited by examiner

PICTURE CODING AND DECODING

CROSS REFERENCE TO RELATED APPLICATIONS

This application is a 35 U.S.C. §371 national stage application of PCT International Application No. PCT/SE2011/050874, filed on 29 Jun. 2011, which itself claims priority to U.S. provisional Patent Application No. 61/366,215, filed 21 Jul. 2010, the disclosure and content of both of which are incorporated by reference herein in their entirety.

TECHNICAL FIELD

The present embodiments generally relate to processing of pictures or video frames, and in particular to the coding and decoding of such pictures or video frame.

BACKGROUND

H.264, also referred to as MPEG-4 (Motion Picture Expert Group) AVC (Advanced Video Coding), is the state of the art video coding standard. It is a hybrid codec that is based on eliminating redundancy between frames, denoted so-called inter coding, and within frames, denoted so called intra coding. The output of the coding process is VCL (Video Coding Layer) data, which is further encapsulated into NAL (Network Abstraction Layer) units prior transmission or storage.

In H.264/MPEG-4 AVC a picture of a video stream is composed of macroblocks with a fixed size of 16×16 pixels and the coding of the picture proceeds macroblock by macroblock. Each picture of the video stream is divided into one or more slices. A slice is an independently decodable piece of the picture. This means that if one slice of a picture is lost, the other slices of the picture are still decodable. In addition, slices can be used for parallel coding and decoding since they are independent from other slices in the picture. In H.264/MPEG-4 AVC a slice boundary must occur between the border of two adjacent, according to the coding order, macroblocks.

HEVC (High Efficiency Video Coding) is a successor to H.264/MPEG-4 AVC. HEVC aims to substantially improve coding efficiency compared to H.264/MPEG-4 AVC, i.e. reduce the bitrate requirements but while keeping the picture quality. HEVC is targeted at next-generation HDTV (High Definition Television) displays and content capture systems which feature progressive scanned frame rates and display resolutions from QVGA (Quarter Video Graphics Array) (320×240) up to 1080p and Ultra HDTV (7680×4320), as well as improved picture quality.

HEVC enables usage of so-called largest coding units (LCUs) that are blocks of pixels having a size that is larger than the macroblocks of H.264/MPEG-4 AVC to provide improved coding efficiency. In order to handle both large homogenous areas and small detailed areas in the same picture a hierarchical coding has been proposed for HEVC. The LCUs in a picture are scanned in a predefined order and each such LCU may be split into smaller coding units (CUs), which in turn may be split hierarchically in a quadtree fashion down to a smallest coding unit (SCU). A picture may, thus, be encoded as a mixture of coding units with different sizes from LCUs down to SCUs.

In correspondence to H.264/MPEG-4 AVC a picture of a video stream can be divided into one or more slices in HEVC. The slice boundary is in HEVC aligned with the border of two adjacent, according to a predefined order, LCUs.

The introduction of hierarchical splitting of the LCUs in HEVC introduces new challenges in connection with coding and decoding of pictures or video frames. There is therefore a need for an efficient coding and decoding that can be applied to such a situation where hierarchical CU splitting is possible.

SUMMARY

It is a general objective to provide an efficient management of slices in pictures and video frames.

It is a particular objective to regulate the coding unit levels at which slice starts within a picture or video frame can be positioned.

These and other objectives are met by embodiments as disclosed herein.

An aspect of the embodiments defines a method of coding a picture comprising multiple slices and being composed of multiple largest coding units having a selected size in terms of number of pixels. A largest coding unit can be hierarchically split into multiple smaller coding units, which in turn can be split into even smaller coding units down to smallest coding units.

The method comprises determining a hierarchical granularity for the picture defining a hierarchical level for slice border alignment. The hierarchical level defines a size of a smallest possible addressable coding unit at which a start of a slice within the picture can be aligned. The hierarchical granularity is employed to generate address information for at least a portion of the slices in the picture. The address information generated for a slice allows identification of the first coding unit of the slice and thereby the slice start within the picture. Coded slice representations are generated for the slices in the picture and are included together with the address information in a coded picture representation of the picture. Information of the hierarchical granularity is associated to the coded picture representation.

Another aspect of the embodiments defines a device for coding a picture comprising multiple slices. The device comprises a granularity determiner configured to determine the hierarchical granularity for the picture defining the hierarchical level for slice border alignment within the picture. An address information generator generates respective address information based on the hierarchical granularity for at least a portion of the slices in the picture. The address information defines the position of a respective first coding unit and slice start of a slice within the picture. The device also comprises a representation generator configured to generate a respective coded slice representation of each slice in the picture. A representation manger of the device includes the coded slice representations and the address information in a coded picture representation to which information of the hierarchical granularity is associated.

A further aspect of the embodiments relates to a method of decoding a coded representation of a picture comprising multiple slices and being composed of multiple largest coding units. Information of a hierarchical granularity is retrieved for the coded picture representation. The hierarchical granularity defines a hierarchical level for slice border alignments and defines a size of a smallest possible addressable coding unit at which a start of a slice can be aligned in the picture. Address information is retrieved from the coded picture representation based on the information of the hierarchical granularity. The address information is employed in order to identify the position of a first coding unit of a slice within the picture and thereby of the slice start. A decoded representation of the pixel values of the pixels in the first coding unit is generated based on the coded picture representation.

Yet another aspect of the embodiments defines a device for decoding a coded picture representation of a picture comprising multiple slices. The device comprises a granularity information retriever configured to retrieve information of a hierarchical granularity for the coded picture representation. The granularity information is employed by an address information retriever to retrieve address information from the coded picture representation. A coding unit identifier uses the address information to identify a position of a first coding unit of a slice within the picture and thereby of the slice start. A representation generator then generates a decoded representation of pixel values for the pixels in the first coding unit based on the coded picture representation.

The embodiments provide an efficient management of slices within pictures or video frames in terms of providing a flexible way of defining and limiting the number of positions within a picture at which slices can start. This enables restrictions of slices starts from a finest level aligned with smallest coding units up to coarser levels possibly even up to the highest level where slice starts can only be aligned with borders between largest coding units.

BRIEF DESCRIPTION OF THE DRAWINGS

The invention, together with further objects and advantages thereof, may best be understood by making reference to the following description taken together with the accompanying drawings, in which:

FIG. 1 is a flow diagram illustrating a method of coding a picture according to an embodiment;

FIG. 2 illustrates an embodiment of a picture divided into multiple slices and comprising multiple largest coding units (LCUs);

FIGS. 3A and 3B illustrate embodiments of a slice start coinciding with a border between coding units within a LCU;

FIG. 4 schematically illustrates an embodiment of a coding and decoding order for processing coding units;

FIG. 5 is a flow diagram illustrating additional steps of the method in FIG. 1 according to an embodiment;

FIG. 6 schematically illustrates an embodiment of a coded picture representation;

FIG. 7 is a flow diagram illustrating an embodiment of decoding a coded picture representation;

FIG. 8 is a flow diagram illustrating an additional step of the method in FIG. 7 according to an embodiment;

FIG. 9 is a flow diagram illustrating an embodiment of the position identifying step in the method of FIG. 7;

FIG. 10 is a schematic block diagram of a device for coding a picture according to an embodiment;

FIG. 11 is a schematic block diagram a device for decoding a coded picture representation according to an embodiment; and FIG. 12 is a schematic block diagram of a media terminal according to an embodiment.

DETAILED DESCRIPTION

Throughout the drawings, the same reference numbers are used for similar or corresponding elements.

The embodiments generally relate to the management of slices within pictures or video frames. In more detail, the embodiments provide a flexible way with high granularity to regulate where the start of slices within a picture or video frame can be positioned. The embodiments are applicable to picture coding and decoding which utilize hierarchical splitting of blocks of pixels into smaller blocks of pixels. The embodiments are therefore well suited to be used in connection with High Efficiency Video Coding (HEVC) but are not limited thereto.

Figure 2:
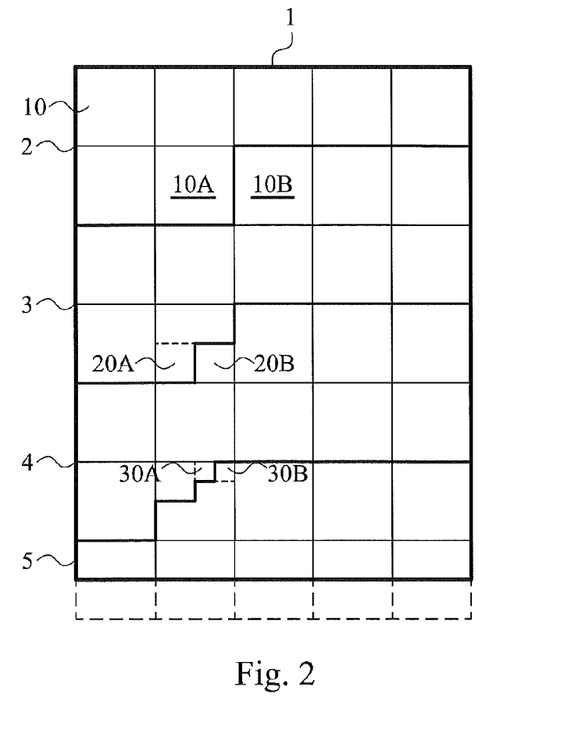

With reference to FIG. 2, according to an embodiment, a picture 1, such as of a video frame in a video stream, can be divided into a number of largest coding units (LCUs) 10, also denoted largest coding tree blocks (LCTBs) or largest coding blocks (LCBs) in the art. The LCU 10 is the largest possible block of pixels that can be handled during encoding and decoding, and can be processed, for instance, according to the well known intra or inter encoding/decoding modes. The LCU 10 can in turn be hierarchically split into a number of smaller, in terms of number of pixels, blocks of pixels, typically denoted coding units (CUs) 20A, 20B, coding tree blocks (CTBs) or coding blocks (CBs). These CUs 20A, 20B may in turn be split further into even smaller blocks 30A, 30B of pixels in a hierarchical manner down to a smallest possible block of pixels, denoted smallest coding unit (SCU) smallest coding tree block (SCTB) or smallest coding block (SCB).

In clear contrast to the prior art techniques that limit the positioning of the start of slice 2, 3 in a picture 1 to be aligned with the border between two adjacent LCUs 10A, 10B, the present embodiments provide a much more flexible slice start positioning by potentially enable the start of the slice 4, 5 to be aligned with the border between any adjacent CUs 10A, 10B, 20A, 20B, 30A, 30B in the picture from the SCU level up to the LCU level. Hence, it is then possible that the slice start will be positioned inside an LCU with the last CU of the preceding slice and the first CU of the current slice in the same LCU. FIG. 2 schematically illustrates this. The border between a first slice 2 and a second slice 3 coincide with the border of two adjacent, according to the processing order, LCUs 10A, 10B. The border between the second slice 3 and a third slice 4 is instead aligned with the border of two coding units 20A, 20B that are each one quarter in size as compared to on LCU 10. Correspondingly, the border between the third slice 4 and a fourth slice 5 is in FIG. 2 aligned with the border of two CUs 30A, 30B, each 1/16 in size as compared to an LCU 10.

The present embodiments provide an efficient way of controlling this granularity level of the slice start positions in a picture. This means that the encoder can set different granularity levels for different pictures or video frames of a video stream or for pictures or video frames belonging to different video streams to thereby control the number of positions at which slice starts can be placed.

This flexibility of setting granularity levels and thereby limiting the positions in a picture at which slices can start is highly advantageous in particular when a same encoder is used in different scenarios. For instance, for one video stream it may be important that the slices are very close to a specific size, such as close to the 1500 byte limit of Internet Protocol (IP) data packets. However, for other video streams no such size limitations with regard to the slices are present or they could be less stringent.

Figure 1:
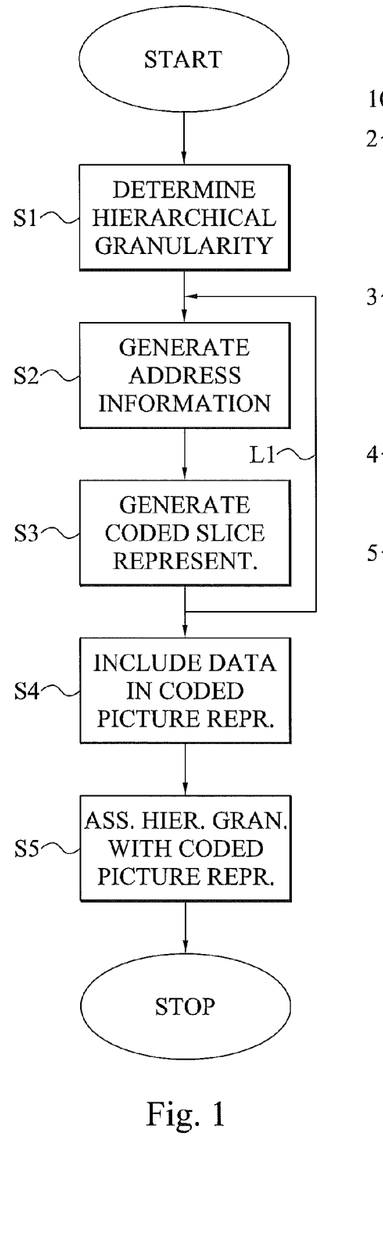

According to the embodiments, "slice" is employed to denote an independently codable and decodable portion of a picture or video frame. A picture can thereby be composed of a single slice or multiple, i.e. at least two, slices, FIG. 1 is a flow diagram illustrating an embodiment of a method of coding a picture. The picture 1 comprises, as illustrated in FIG. 2, multiple LCUs 10 having a selected size in terms of number of pixels. This means that each LCU 10 of the picture 1 preferably has the same number of pixels. The LCUs 10 could be rectangular but are preferably quadratic, i.e. comprises M×M pixels, where M is a defined positive integer equal to or preferably larger than two and preferably M=2$^m$, where m is a positive integer. Non-limiting examples of suitable values of M is 64 or 128. Each LCU of the picture can potentially be hierarchically split into multiple smaller CUs having respective sizes that are smaller than the selected size of the LCUs.

Generally, hierarchically splitting a LCU involves splitting the LCU in quadtree fashion. As is well known in the art, a quadtree is a tree data structure in which each internal node has exactly four children. Hierarchically splitting the LCU thereby implies partitioning the two dimensional space of the picture occupied by the LCU by recursively subdividing it into four quadrant or regions. In a preferred embodiment, the recursively splitting involves division into four equally sized CUs. According to the embodiments, if a coding unit, i.e. either LCU or a smaller CU, is split a so-called split coding unit flag associated with the coding unit is set to a defined value, preferably $1_{bin}$ or in the form of a logical one or some other defined symbol, indicating that the coding unit is hierarchically split into multiple, preferably four, smaller CUs. Correspondingly, if a splittable coding unit, i.e, a coding unit that is larger than the SCU, is not split a split coding unit flag associated with the coding unit is preferably instead set to $0_{bin}$ or in the form of a logical zero or some other defined symbol. "Splittable" coding unit refers herein to a coding unit that is capable of being hierarchically split into multiple, preferably four, smaller coding units. Generally any coding unit except the SCUs is a splittable coding unit. Although a coding unit can be split into smaller coding units it does not have to be split, for instance if such splitting would not improve the coding quality of the picture.

Figure 4:
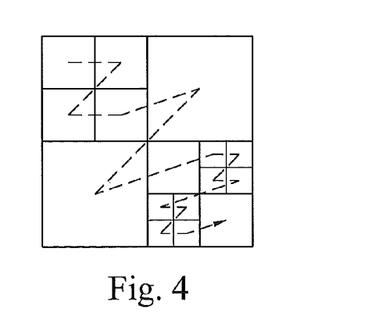

The hierarchical splitting of the embodiments preferably processes LCU per LCU in a defined processing order, such as the raster scan order. The raster scan order is generally from left to right and from up to down. Alternatively, another coding/decoding order, such as the Morton or Z order could be used. FIG. 4 illustrates the principles of the Morton order. If an LCU is split into, preferably four equally sized, CUs, these CUs can then be further processed in a processing order in order to select whether they should be hierarchically split into, preferably four equally sized, even smaller CUs. This processing order could be the same order as when processing the LCUs in the picture. In an alternative approach, the LCUs are processed in the raster scan order with the CUs being processed in a coding/decoding order, such as Morton order. The embodiments are though not limited to the above listed examples of processing orders.

Thus, for each coding unit it is determined whether to split the coding unit further into smaller coding units unless the coding unit is the SCU, which cannot be hierarchically split further. Each time a coding unit is split a split coding unit flag associated with the coding unit is preferably set to one and if it is determined that a coding unit is not further split into smaller coding unit its associated split coding unit flag is preferably set to zero. A SCU typically does not need to have any associated split coding unit flag since it cannot be split further.

This decision whether to split a coding unit is based on the coding process. For instance, a picture area that represents a fairly homogenous background is more efficiently represented using large CU sizes, such as LCUs, as compared to splitting the picture area into smaller coding units. However, picture areas with small details or a lot of such details can generally not be correctly represented if using large coding units. In such a case, it is more efficient and preferred from coding quality point of view to use several smaller CUs for the picture area. The selection of whether to further split a CU can thereby performed according to techniques described in the art and preferably based on the coding efficiency and quality.

The method starts in step S1 where a hierarchical granularity is determined for the picture. The hierarchical granularity defines a hierarchical level for slice border alignments within the picture. This hierarchical level defines and limits the size of a smallest possible addressable coding unit at which a start of a slice in the picture can be aligned. The hierarchical level and the determined hierarchical granularity thereby define the maximum number of slice start positions that are potentially available and can be addressed in the picture and at which a slice start can be positioned. This means that the hierarchical granularity defines the number of addressable CUs within the picture, where the start of a slice can be aligned between the border of such an addressable CU and a previous, according to a defined processing order, CU in the picture.

For instance, an LCU having a selected size of 64×64 pixels could have a slice granularity defining a granularity level of 0 to 3 with an SCU size of 8×8 pixel. In such a case, a granularity level of 0 indicates that slice starts can only be aligned with borders between LCUs. With a picture of 1280×960 pixels this implies 20×15=300 possible slice start positions. If the granularity level instead is 1, the smallest possible coding unit at which a slice start can be aligned is instead 32×32 pixels with a total of 40×30=1200 possible slice start positions. Correspondingly, a granularity level of 2 means that there are 80×60=4800 possible slice start positions since the slice starts can be aligned with CUs of 16×16 pixels or larger. Finally, a granularity level of 3 indicates that slice starts can be aligned with the SCU borders giving a total of 160×120=19200 possible slice start positions.

A reason why one would like to have the possibility to select between these cases of from 300 up to 19200 possible slice start positions in the present example is that the more slice start positions that are available in the picture the longer slice start addresses are needed, thereby increasing the overhead of the coded picture data. Thus, if there are no specific demands on target slice sizes, such as fitting the slice data in a single IP data packet, it could be advantageous to limit the number of slice start positions in a picture to thereby reduce the amount of address data that needs to be generated and transmitted to the decoder.

A next step S2 generates address information for at least a portion of the slices in the picture. The address information allows identification of a respective first coding unit of the slices and thereby the start of the slices. According to the embodiments, the address information is generated in step S2 based on the hierarchical granularity determined in step S1.

A next step S3 generates a coded slice representation of the slice. The coded slice representation is a coded representation of the pixel values of the pixels in the slice. The coded slice representation is generated according to well known coding techniques, such as defined by HEVC and inter and intra coding modes.

The loop of steps S2 and S3 are preferably repeated for at least a portion of the slices in the picture, which is schematically illustrated by the line L1. In particular, step S3 is performed for each slice in the picture to thereby encode all the pixels of the picture. Step S2 could also be performed for each slice in the picture so that each slice has respective address information that allows identification of the first coding unit in the respective slice. In an embodiment, step S2 is only performed for each slice in the picture except the first slice. The start of the first slice is typically at a defined position in the picture, such as the upper left corner. This means that no address information, except the slice flag, is actually required by a decoder in order to identify the slice start and the position of the first coding unit in the first slice of the picture.

In an embodiment, the coded slice representations generated in step S3 can include or be associated with a respective slice flag that is employed to indicate whether the slice is the first slice in the picture. If the slice flag has a defined value, such as $1_{bin}$, a logical one or some other defined symbol, then the present slice is the first slice, and if it has another defined value, such as $0_{bin}$, a logical zero or some other defined symbol, the present slice is not the first slice in the picture. The explicit signaling of the first slice is advantageous since then no address information is needed for the first slice. This saves bits since no address information will be needed for the first slice but merely for any second and remaining slices in the picture. This saving in bits comes at the cost of one additional flag bit per slice in the picture but this added overhead will generally be much smaller as compared to the bit length of the address information that is no longer needed for the first slice.

Figure 6:
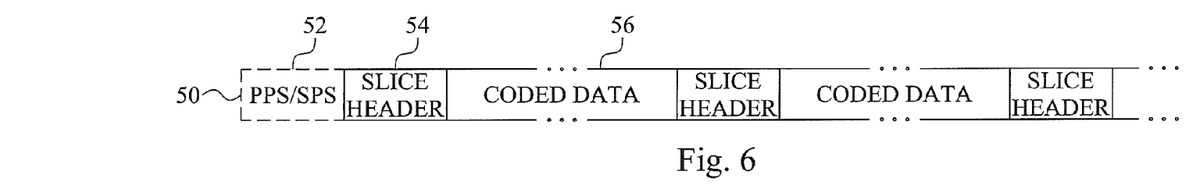

A next step S4 includes the respective coded slice representations and the address information in a coded picture representation of the picture. FIG. 6 is a schematic illustration of an, embodiment of such a coded picture representation 50. Generally the coded picture representation 50 comprises two main parts for each slice, a slice header 54 and coded data 56. The coded picture representation 50 is typically in the form of a sequence or stream of bits, though other symbol alphabets besides the binary alphabet could be used and are within the scope of the invention, such as hexadecimal or decimal alphabet. The slice header 54 typically comprises the address information generated in step S2 for the slice, such as in the form of a codeword first_cu_in_slice or the codeword slice_address. In particular embodiments, additional information can be included in the slice header including, for instance, coding type of the slice and the previously mentioned slice flag.

The coded data 56 then carries the coded picture data of the pixels in the slice, i.e. the coded slice representations generated in step S3, together with the split coding unit flags discussed in the foregoing.

The coded representation 50 may optionally also comprise or otherwise be associated with a picture parameter set (PPS) and/or a sequence parameter set (SPS) 52. The PPS/SPS 52 could form a part of the coded picture representation 50. In such a case, each coded picture representation 50 of a video stream could have a respective PPS and/or SPS field 52. In an alternative approach, not all such coded picture representations 50 of the video stream need to carry the PPS and/or SPS field 52. For instance, the first coded picture representation 50 of the video stream could include the PPS and/or SPS field 52 and then such fields are only included in another coded picture representation of the video stream if any of the parameters in the PPS and/or SPS field 52 are updated or changed. A further variant is to signal the PPS and/or SPS field 52 out of band with regard to the coded picture presentation 50. In such a case, the PPS and/or SPS field 52 could be sent separately from the coded picture representation 50 but in such a way that the decoder is able to identify to which video stream or coded picture representation the PPS and/or SPS field 52 belongs. This can be achieved by including a session, stream and/or picture identifier in both the coded picture representation 50 and in the PPS and/or SPS field 52.

The method of FIG. 1 then continues to step S5 where the information of the hierarchical granularity is associated to the coded picture representation. This association between the granularity information and the coded picture representation can be achieved according to various embodiments. Firstly, the granularity information can be included in the previously mentioned PPS field or SPS field, such as in the form of a slice_granularity codeword. The PPS and/or SPS field can then be included in coded picture representation or could otherwise be associated thereto, such as transmitted together with a previous coded picture representation of the video stream or signaled out of band. Alternatively, the granularity information could be included in the coded picture representation, such as in a global header, e.g. PPS or SPS field if present, or in a slice header. In such a case, each coded picture representation could carry granularity information. However, it is generally not necessary to provide this granularity information for each coded picture representation of a video stream but only signal it once and then anew signal granularity information if the hierarchical granularity changes or is updated. In such a case, the granularity information needs only be included in or associated with coded picture representations for which an update of the hierarchical granularity is needed. This means that steps S1 and S5 of FIG. 1 are not necessarily performed for each picture or video frame of a video stream to be encoded. However, steps S1 and S5 are performed at least once for the video stream to determine the hierarchical granularity and associate it with a coded picture representation to thereby inform the decoder of the determined hierarchical granularity.

Step S5 of FIG. 1 can be performed at any point of the method of FIG. 1 after step S1. This means that step S5 can be performed prior, after or indeed at least partly in parallel with any of the steps S2 to S4. Correspondingly, step S4 can be performed directly following step S3 before continuing to step S2 to generate encode a new slice of the picture. Alternatively, step S4 is performed once when all slices have been encoded. As previously mentioned a slice is a independently encodable and decodable portion of a picture. This means that steps S2 and S3 or steps S2 to S4 can be performed at least partly in parallel for multiple slices of the picture to thereby speed up the total encoding time for the picture.

Once all slices of a picture has been encoded, the encoding process preferably continues with any remaining pictures, for instance of a video stream. In such a case, steps S2 to S4 are performed for these remaining pictures as discussed above. Steps S1 and S5 may also be performed for these remaining pictures but are typically only conducted if there is a need to update or change the hierarchical granularity.

In an embodiment, the size of the LCUs in the picture could be predefined and thereby known to the encoder and the decoder. For instance, the LCU size could be 128×128 pixels or 64×64 pixels. No determination or signaling of the LCU size is thereby needed. Correspondingly, the size of the SCUs in the picture could be predefined. Examples of such fixed and predefined SCU sizes that can be employed are 16×16 pixels or 8×8 pixels.

In alternative embodiments, the encoding process may additionally determine the LCU size and/or the SCU size to employ for the current picture(s). This could be beneficial to thereby adapt these LCU and/or SCU sizes to the particular characteristics of the present picture. For instance, for some pictures being basically a uniform or homogenous background view larger LCU and SCU sizes could be preferred and leading to more efficient coding as compared to pictures with a lot of small details where smaller LCU and SCU sizes could be preferred.

In an embodiment, the LCU size and/or the SCU size are therefore determined during the encoding, such as based on the pixel values of the picture. A notification of the determined LCU size and/or a notification of the determined SCU size is then associated with the coded representation of the picture. The association of the notification(s) and the coded representation can be conducted according to various embodiments. For instance, the notifications can be included in the coded picture representation. An alternative is to include the notifications in the PPS or SPS.

The SCU size could then be defined based on the codeword log2_min_coding_block_size_minus3 and preferably by calculating the parameter Log2MinCUSize as Log2MinCUSize=log2_min_coding_block_size_minus3+3. This parameter Log2MinCUSize is then employed as SCU size representation and gives the SCU size MinCUSize= (1<<Log2MinCUSize), where << denotes a left shift operator. Depending on the value of the parameter Log2MinCUSize and thereby on the parameter log2_min_coding_block_size_minus3 the SCU size could then be 8 or 16 as illustrative example.

The LCU size is preferably determined relative the SCU size by defining the codeword log2_diff_max_min_coding_block_size. In more detail, the parameter Log2MaxCUSize is calculated as Log2MaxCUSize=log2_min_coding_block_size_minus3+3+log2_diff_max_min_coding_block_size. This parameter Log2MaxCUSize is then employed as LCU size representation and gives the LCU size MaxCUSize= (1<<Log2MaxCUSize). Depending on the value of the parameter Log2MaxCUSize and thereby on the codewords log2_min_coding_block_size_minus3 and log2_diff_max_min_coding_block_size the LCU size could then be 64 or 128 as illustrative example.

The notifications of the SCU size and the LCU size could thereby be the codewords log2_min_coding_block_size_minus3 and log2_diff_max_min_coding_block_size.

In an alternative embodiment, the LCU size is not determined relative the SCU size. This means that that no SCU parameter is needed to determine the LCU size.

Figure 5:
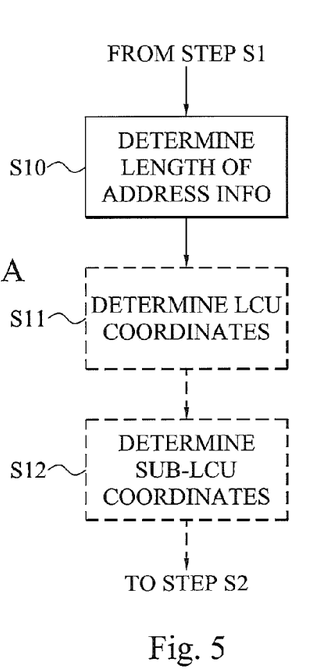

FIG. 5 is a flow diagram illustrating additional steps of the method in FIG. 1 according to various embodiments. The method continues from step S1 in FIG. 1. A next step S10 uses the hierarchical granularity determined in step S1 of FIG. 1 to determine or calculate the length of the address information to be generated for a slice. The length defines the number of bits or indeed other symbols required to represent the position of the slice start in the picture.

The address information generated for a slice, preferably for each slice except the first slice in the picture, could be according to various embodiments. The address information could define the position of the slice start and the first CU of the slice as a simple number. The different possible slice start positions and addressable coding units are then numbered from zero and upwards. For instance, a 1280×960 pixels picture have 4800 unique slice start positions if the hierarchical granularity defines that the size of the smallest possible addressable coding unit at which a slice start in the picture can be aligned is 16×16 pixel. These positions could then be numbered from 0 up to 4799, thereby requiring 13-bit slice addresses.

An alternative is to handle the X and Y coordinates separately. With the above example, the X coordinate is from 0 to 79 and the Y coordinate is from 0 to 44, thereby requiring 7 plus 6 bits for the slice addresses.

A further alternative is to determine the address information so that LCU coordinates and sub-LCU coordinates can be retrieved therefrom. This is schematically illustrated in steps S11 and S12. Step S11, thus, determines, for the at least a portion of the multiple slices, the coordinates of a position of a LCU within the picture. The slice start and the first CU of the slice are then positioned in the picture inside this LCU.

The coordinates are then in relation to a global origin or start point, typically the upper left corner of the picture. The LCU coordinates could then be the coordinates of the LCU in relation to this global origin, such as in terms of a LCU number or in terms of X and Y coordinates as mentioned above. A next step S12 determines the coordinates of the position of the first CU and thereby the slice start within the LCU. These coordinates are then relative a local origin or start point, typically the upper left corner of the LCU. These sub-LCU coordinates could also be in the form of a number or in terms of X and Y coordinates.

The method then continues to step S2 of FIG. 1 where the address information is generated based on the LCU coordinates and sub-LCU coordinates and the hierarchical granularity. The hierarchical granularity is employed when defining the sub-LCU coordinates by restricting and defining the possible start positions for the slice and the first CU of the slice within the LCU.

In an embodiment, a first or LCU representation is generated based on the determined LCU coordinates and a second or sub-LCU representation is generated based on the sub-LCU coordinates. The address information could then comprise these two representations. Alternatively, the address information is generated in such a way that the LCU coordinates and the sub-LCU coordinates can be determined or calculated from the address information.

Deriving the LCU and sub-LCU coordinates could be performed according to below as a non-limiting but illustrative example.

The hierarchical granularity determined in step S1 is defined by the codeword slice_granularity. Slice_granularity is typically a 2-bit value ranging from $00_{bin}$=0 up to a maximum of $11_{bin}$=3. This enables four different hierarchical levels. If merely two such hierarchical levels are needed slice_granularity could instead by a 1-bit value. Correspondingly, for more than four hierarchical levels a 3-bit or longer slice_granularity codeword is needed. Alternatively, variable length coding is possible for signaling the hierarchical granularity.

The slice_granularity codeword is optionally defined to not be larger than the minimum of two other parameters determined during encoding of the picture or video stream: Log2MaxCUSize-4 and log2_diff_max_min_coding_block_size. The codeword slice_granularity is then, during decoding, employed to calculate the parameter SliceGranularity as SliceGranularity= (slice_granularity<<1).

The address information generated during encoding is the codeword slice_address. This codeword defines the slice address in slice granularity resolution in which the slice starts. The length of the address information, i.e. slice_address, is as mentioned above determined based on the hierarchical granularity. In a particular embodiment, the length of the slice_address in terms of number of bits is equal to ceil($log_2$(NumLCUsInPicture)+SliceGranularity). Ceil( ) denotes the ceiling function defined as ceil(x)=⌈x⌉ and outputs the smallest integer not less than x.

The parameter NumLCUsInPicture defines the total number of LCUs in the picture and is determined based on the size of the picture and based on the size of the LCUs, which is either fixed or determined as mentioned in the foregoing. The parameter NumLCUsInPicture can then be included in the coded picture representation or be associated thereto, such as in a PPS or SPS field. Alternatively, a decoder is able to itself calculate the parameter NumLCUsInPicture based on the LCU size (log2_min_coding_block_size_minus3 and log2_diff_max_min_coding_block_size) and the total size of the picture, which is signaled to the decoder in or associated with the coded picture representation.

The LCU part of the slice address according to a processing order, such as raster scan order, is then defined as LCUAddress=(slice_address>>SliceGranularity), where >> denotes a right shift operator. The sub-LCU part of the slice address according to a processing order, such as Morton order, is then calculated as GranularityAddress=slice_address−(LCUAddress<<SliceGranularity).

The slice address is then determined based on the LCUAddress and the GranularityAddress as SliceAddress=(LCUAddress<<(log2_diff_max_min_coding_block_size<<1))(GranularityAddress<<((log2_diff_max_min_coding_block_size<<1)−SliceGranularity)).

An alternative would be to use a variable length representation. An example of a variable length code that can be used is the universal variable length coding (UVLC) as mentioned in Lee and Kuo, Complexity Modeling of H.264/AVC CAVLC/UVLC Entropy Decoders, IEEE International Symposium on Circuits and Systems (ISCAS2008), 2008, pp. 1616-1619. Briefly, UVLC uses Exp-Golomb (EG) code. The EG code for an unsigned integer value C is [P zeros][1][info], where P=floor($\log_2$(C+1)) and info=C+1−2P.

Figure 3A:
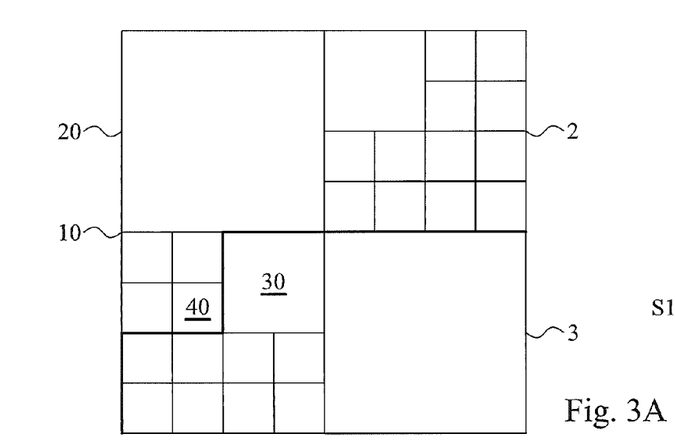
Figure 3B:
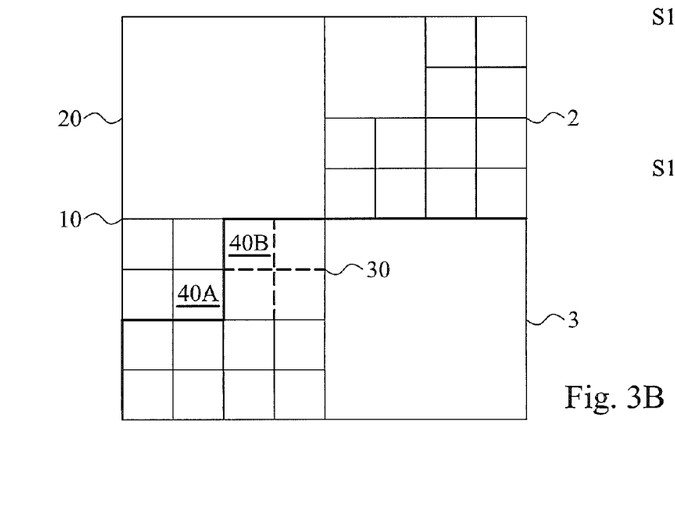

The address information not only defines the position of the first CU and thereby the start of a slice but additionally defines the size of the largest possible CU that can occupy the position in the picture defined by the address information. This means that this size is dependent on the position as determined by the address information. Though, the address information gives the size of the largest possible CU that can occupy the position, the size of the first CU does not need to be equal to the size of this largest possible CU that can occupy the position. FIGS. 3A and 3B illustrate this concept. In the figures reference numbers 2, 3 denote two different slices in a picture and the bold line defines the border between the two slices 2, 3. The slice border occurs in these examples within the area of the picture occupied by a LCU 10. Reference number 20 denotes a CU obtained for a granularity of 1 when the LCU 10 is hierarchically split into four CUs 20. With a granularity of 2 this CU 20 can be hierarchically split into four smaller CUs 30. In FIGS. 3A and 3B showing a case with a granularity of 3 a CU 30 can be split into four SCUs 40.

In FIG. 3A the first CU of the slice 3 is referenced by 30, whereas in FIG. 3B it is referenced by 40B. The reference numbers 40 (FIG. 3A) and 40A (FIG. 3B) denote a preceding CU of the LCU 10 according to the defined processing order, which in this example is the Morton order. In both FIGS. 3A and 3B the start of the slice and the position of the first CU 30, 40B are the same though the first CU 30, 40B have different sizes in the two examples. The address information is, however, typically the same in both these cases and the size of the largest possible CU 30 that can occupy the relevant position is the same. The two cases can be differentiated by complementing the address information with additional information in terms of so-called split coding unit flags.

In an example, assume that the size of a LCU is 128×128 pixels and a corresponding size of a SCU is 16×16 pixels. Further assume that the LCUs 10 of FIGS. 3A and 3B consists of two slices 2, 3 then the coded representation could be defined as:

Slice_header_syntax( ) // slice 2 in FIG. 3A—includes the address information
    split_coding_unit_flag=1 // split 128×128 LCU into four 64×64 CUs
    split_coding_unit_flag=0 // first 64×64 CU is not split further
    code of first 64×64 CU the coded representation of the pixel values of the first 64×64 CU
    split_coding_unit_flag=1 // split second 64×64 CU into four 32×32 CUs
    split_coding_unit_flag=0 // first 32×32 CU is not split further
    code of first 32×32 CU the coded representation of the pixel values of the first 32×32 CU
    split_coding_unit_flag=1 // split second 32×32 CU into four SCUs, no further split coding unit flags are needed
    code of first SCU // the coded representation of the pixel values of the first SCU
    code of second SCU // the coded representation of the pixel values of the second SCU
    code of third SCU // the coded representation of the pixel values of the third SCU
    code of fourth SCU // the coded representation of the pixel values of the fourth SCU
    split_coding_unit_flag=1 // split third 32×32 CU into four SCUs, no further split coding unit flags are needed
    code of first SCU // the coded representation of the pixel values of the first SCU
    code of second SCU // the coded representation of the pixel values of the second SCU
    code of third SCU // the coded representation of the pixel values of the third SCU
    code of fourth SCU // the coded representation of the pixel values of the fourth SCU
    split_coding_unit_flag=1 // split fourth 32×32 CU into four SCUs, no further split coding unit flags are needed
    code of first SCU // the coded representation of the pixel values of the first SCU
    code of second SCU // the coded representation of the pixel values of the second SCU
    code of third SCU // the coded representation of the pixel values of the third SCU
    code of fourth SCU // the coded representation of the pixel values of the fourth SCU
    split_coding_unit_flag=1 // split third 64×64 CU into four 32×32 CUs
    split_coding_unit_flag=1 // split first 32×32 CU into four SCUs, no further split coding unit flags are needed
    code of first SCU // the coded representation of the pixel values of the first SCU
    code of second SCU // the coded representation of the pixel values of the second SCU
    code of third SCU // the coded representation of the pixel values of the third SCU
    code of fourth SCU // the coded representation of the pixel values of preceding CU 40 in FIG. 3A
    Slice_header_syntax( ) // slice 3 in FIG. 3A—includes the address information
    split_coding_unit_flag=0 // split coding unit flag of first CU is set to zero since the size of the first CU is equal to the size of the largest possible CU that can occupy the position in the picture defined by the generated address information.—The largest possible CU at this address is 32×32 and no split flags splitting down to 32×32 are needed. Instead the size 32×32 is derived from the address and the granularity.
    code of first CU // the coded representation of the pixel values of the CU 30 in FIG. 3A
    split_coding_unit_flag=1 // split 32×32 CU into four SCUs, no further split coding unit flags are needed
    code of first SCU // the coded representation of the pixel values of the first SCU
    code of second SCU // the coded representation of the pixel values of the second SCU

```
code of third SCU // the coded representation of the pixel
    values of the third SCU
code of fourth SCU // the coded representation of the pixel
    values of the fourth SCU
split_coding_unit_flag=1 // split 32×32 CU into four
SCUs, no further split coding unit flags are needed
    code of first SCU // the coded representation of the pixel
        values of the first SCU
    code of second SCU // the coded representation of the pixel
        values of the second SCU
    code of third SCU // the coded representation of the pixel
        values of the third SCU
    code of fourth SCU // the coded representation of the pixel
        values of the fourth SCU
split_coding_unit_flag=0 // no further split of 64×64 CU
code of 64×64 CU // the coded representation of the pixel
    values of the first 64×64 CU
```

In the embodiment illustrated in FIG. 3B the code for the first slice 2 would be the same as above, whereas for the second slice 3 the code would instead become:

```
Slice_header_syntax( ) // slice 3 in FIG. 3B—includes the
address information
split_coding_unit_flag=1 // split coding unit flag of first
CU is set to one since the size of the first CU is smaller than
the size of the largest possible CU that can occupy the posi-
tion in the picture defined by the generated address informa-
tion, no further split coding unit flags are needed,
    code of first CU // the coded representation of the pixel
        values of the first CU 40B in FIG. 3B
    code of second SCU // the coded representation of the pixel
        values of the second SCU
    code of third SCU // the coded representation of the pixel
        values of the third SCU
    code of fourth SCU // the coded representation of the pixel
        values of the fourth SCU
split_coding_unit_flag=1 // split 32×32 CU into four
SCUs, no further split coding unit flags are needed
    code of first SCU // the coded representation of the pixel
        values of the first SCU
    code of second SCU // the coded representation of the pixel
        values of the second SCU
    code of third SCU // the coded representation of the pixel
        values of the third SCU
    code of fourth SCU // the coded representation of the pixel
        values of the fourth SCU
split_coding_unit_flag=1 // split 32×32 CU into four
SCUs, no further split coding unit flags are needed
    code of first SCU // the coded representation of the pixel
        values of the first SCU
    code of second SCU // the coded representation of the pixel
        values of the second SCU
    code of third SCU // the coded representation of the pixel
        values of the third SCU
    code of fourth SCU // the coded representation of the pixel
        values of the fourth SCU
split_coding_unit_flag=0 // no further split of 64×64 CU
code of 64×64 CU // the coded representation of the pixel
    values of the first 64×64 CU
```

Figure 7:
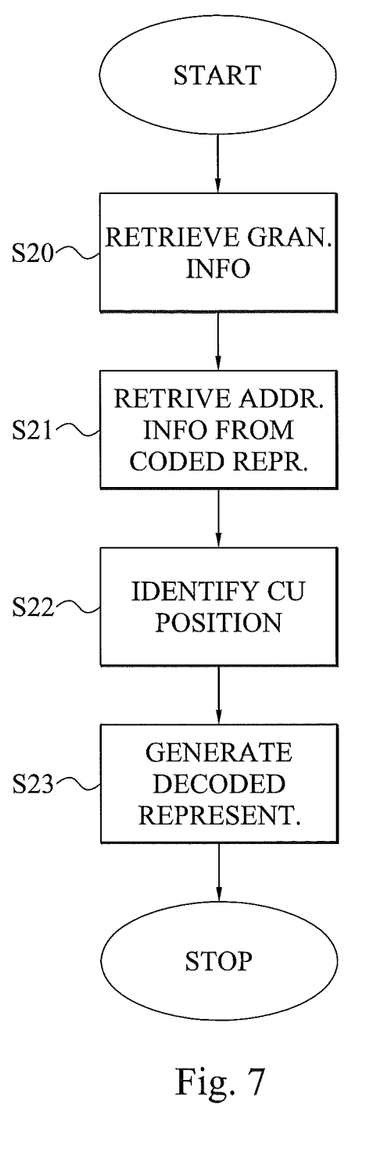

FIG. 7 is a flow diagram illustrating a method of decoding a coded picture representation of a picture comprising multiple slices and being composed of multiple LCUs. The method starts in step S20 where information of hierarchical granularity is retrieved for the coded picture representation. As previously discussed herein, the granularity information can be included in the coded picture representation and is then retrieved therefrom in step S20. Alternatively, the granularity information can have been included in a previously received coded picture representation relating to a same video stream. In such a case, the granularity information is retrieved therefrom and stored for later use when decoding following coded picture representations. The granularity information could also have been sent separate from any coded picture representation, such as a separate PPS or SPS field. Session, picture or stream identifiers could then be used to identify the relevant granularity information for the present coded picture representation.

A next step S21 retrieves address information from the coded picture representation based on the information of the hierarchical granularity from step S20. Thus, the granularity information is employed in step S21 in order to identify those bits or symbols of the coded picture representation that defines the address information of a current slice to be decoded.

Once the address information has been identified and read from the coded picture representation it is processed as described herein in order to identify the position of a first coding unit of the slice within the picture and thereby the start of the slice within the picture in step S22.

The retrieval of address information in step S21 and the identification of the first CU and slice start position in step S22 are typically performed for each slice in the picture except the first slice. The start position of this first slice is typically fixed, i.e. upper left corner of the picture and no address information is thereby required for the first slice. In an optional embodiment, a slice flag is therefore retrieved from the coded picture representation prior to retrieving the address information. If the slice flag has a defined value, such as one, the present slice is the first slice and the method continues to step S23, thereby omitting steps S21 and S22 for this slice. If the slice flag instead has another defined value, such as zero, the present slice is not the first slice and the method continues with step S21.

The coded data of the coded picture representation, i.e. the coded slice representation, is then employed in step S23 to generate a decoded representation of the pixel values of the pixels in the first CU. The decoded representations of the pixel values are generated according to well known decoding techniques, such as inter- or intra-mode decoding. The decoded representations of the pixel values are particularly generated based on the coded data found in the coded data portion 56 of FIG. 6.

The method then ends or typically continues by decoding remaining CUs and pixels of the slice. As mentioned above, the LCUs of a picture can be decoded in one processing order, such as raster scan order. The CUs within the LCU can then be decoded in the same processing order or in another order, such as the Morton order. Thus, step S23 typically generates a complete decoded representation of the slice. Steps S21 to S23 are then repeated for remaining slices in the picture. Step S20 is generally only conducted once to get the granularity information and need then only be performed once more if the hierarchical granularity has changed or been updated for remaining slices or pictures in a video stream. Since slices are decodable independently, steps S21 to S23 can be performed in parallel for different slices in order to reduce the total decoding time.

Pixel value as used herein denotes any value of a pixel property assigned to a pixel. In typical implementations for HEVC the pixel value is a color value. Different color formats are known in the art and can be used according to the embodiments. For instance, a color value could comprise both luminance and chrominance components, typically one luminance value and two chrominance components. A pixel value could therefore be a luminance value of a pixel, a chrominance value of a pixel or indeed both luminance and chrominance values. Another example of a common color format is the so-called RGB format, which stands for Red-Green-Blue. A color value then comprises both a red, green and blue value. A pixel value could then be a RGB value, a red value, a green value or a blue value. Also variants of the RGB format, such as RGBA are known and can be used according to the embodiments.

In fact, the embodiments do not necessarily have to be limited to usage of color values as pixel values but can also be applied to other known pixel values including grayscale values, normal values, i.e. X, Y, Z coordinate values, etc.

Figure 8:
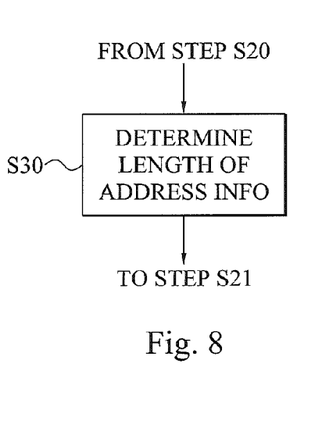

FIG. 8 is a flow diagram illustrating an additional optional method of the decoding method in FIG. 7. The method continues from step S20 of FIG. 7. A next step S30 determines the length of the address information of the current slice based on the information of the hierarchical granularity. In a particular embodiment, the length of the address information is defined as ceil(log$_2$(NumLCUsInPicture)+SliceGranularity). Thus, in a particular embodiment the length of the address information is determined based on the information of the hierarchical granularity and based on information of the number of LCUs in the current picture. The parameter SliceGranularity is obtained directly from the granularity information slice_granularity as SliceGranularity=(slice_granularity<<1). The codeword NumLCUsInPicture could be retrieved from the coded picture representation or from global header information, such as PPS or SPS fields. Alternatively, NumLCUsInPicture is calculated based on information of the total size of the picture, as retrieved from the coded picture representation or from the global header, and information of the LCU size, e.g. the previously mentioned log2_min_coding_block_size_minus3 and log2_diff_max_min_coding_block_size codewords.

The method then continues to step S21 of FIG. 7, where the address information is retrieved from the coded picture representation based on the determined length of the address information in terms of the number of bits.

Figure 9:
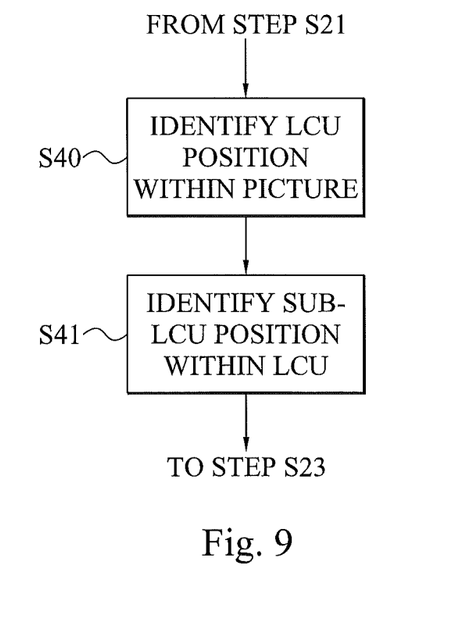

FIG. 9 is a flow diagram illustrating a particular embodiment of identifying the position of the first coding unit of the slice and thereby the slice start within the picture. The method continues from step S21 of FIG. 7. A next step S40 identifies a position of an LCU within the picture in which the first CU and the slice start is present. Step S40 employs the address information in order to determine the LCU position. For instance, the parameter LCUAddress can be determined as slice_address>>SliceGranularity, where slice_address represents the address information. A next step S41 correspondingly identifies a position of the first CU within the LCU identified in step S40. This sub-LCU position is also identified based on the address information. For instance, the parameter GranularityAddress is determined as slice_address−(LCUAddress<<SliceGranularity).

The LCU and sub-LCU parts can then be employed to calculate the final slice address as (LCUAddress<<log2_diff_max_min_coding_block_size<<1))+(GranularityAddress<<((log2_diff_max_min_coding_block_size<<1)−SliceGranularity)).

In alternative embodiments, the address information retrieved from the coded picture representation is employed directly to identify the slice start and the first coding unit. The address information could then correspond to the number of slice start positions or addressable CUs at which the slice is started. Alternatively, X and Y coordinates are derived from address information and employed to locate the slice start. A further variant is to retrieve or calculate from the address information LCU coordinates and sub-LCU coordinates as previously described herein.

The address information not only defines the position of the first CU of the slice and the slice start but preferably also defines the size of the first CU. Thus, the size of the first CU is determined based at least partly on the address information. In more detail, the address information dictates the largest possible size in terms of number of pixels that the first CU can have. This means that the first CU can have a size equal to this largest possible size or a size smaller than the largest possible size. In the latter case, a split coding unit flag is further employed in addition to the address information in order to define the correct size of the first CU, which is further discussed herein.

For instance, the first CU can be associated with a split coding unit flag included in the coded picture representation, typically in the coded data portion. The value of the split coding unit flag is then employed together with the address information in order to define the correct size of the first CU. Thus, if the split coding unit flag is set to a defined value, preferably one, the size of the first CU is smaller than the size of the largest possible CU that can occupy the position within the picture defined based on the address information, see FIG. 3B. However, if the split coding unit flag is set to another defined value, preferably zero, the size of the first CU is equal to the size of the largest possible CU that can occupy the position in the picture defined by the address information, see FIG. 3A.

It is possible that the first CU is associated with multiple split coding unit flags. For instance, if the size of the largest possible CU is 32×32 pixels, whereas the size of the first CU is 8×8 pixels with a LCU size and SCU size of 64×64 pixels and 8×8 pixels, the code would be:

split_coding_unit_flag=1 // 32×32 CU is divided into 16×16 CUs split_coding_unit_flag=1 // first 16×16 CU is split into SCUs, no further split coding unit flag is needed since we have now reached the target size of the first CU and this is also the SCU size implying that now further splitting is possible In some embodiments, the size of the first CU can be determined solely based on the address information without using any split coding unit flag as additional information. This is possible when the size of the largest possible CU that can occupy the position within the picture defined based on the address information is equal to the SCU size. In such a case, it is not possible to split this largest possible CU further since it is in fact a SCU.

Figure 10:
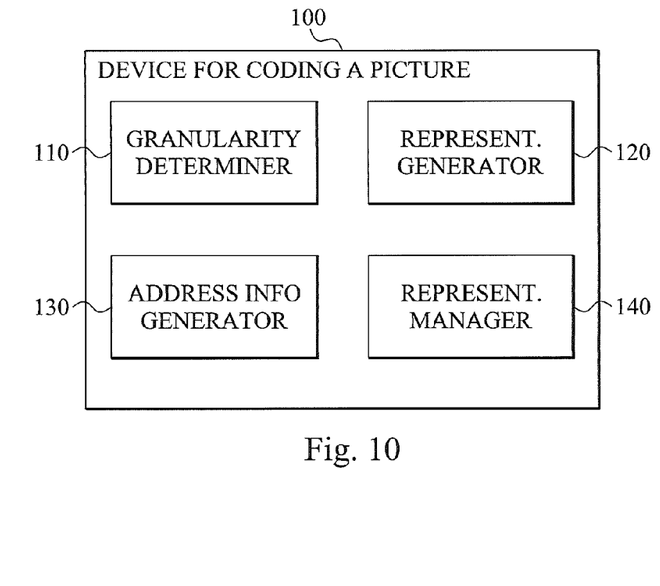

FIG. 10 is a schematic block diagram of an encoder or device 100 for coding a picture comprising multiple slices and being composed of multiple LCUs. The device 100 comprises a granularity determiner 110 configured to determining the hierarchical granularity for the picture, preferably in the form of the slice_granularity codeword. A representation generator 120 of the device 100 generates a respective coded slice representation of each slice in the picture. The representation generator 120 encodes the pixel values of the pixels in the slice according to well known coding schemes, such as intra or inter coding modes. An address information generator 130 generates respective address information for each slice of at least a portion of the slices in the picture. In a particular embodiment, the address information generator 130 generates address information for each slice except the first slice in the picture. In an optional embodiment, the address information generator 130 additional sets the slice flags for the slices to indicate whether the current slice is the first slice (slice flag equal to one) or is not the first slice (slice flag equal to zero).

The address information generator 130 generates the address information based on the hierarchical granularity determined by the granularity determiner 110 as described herein.

The device 100 also comprises a representation manager 140 configured to include the respective coded slice representations from the representation generator 120 and the address information and optionally the slice flags from the address information generator 130 in a coded picture representation of the picture. The representation manager 140 additionally associates information of the hierarchical granularity to the coded picture representation, for instance by including the granularity information in the coded picture representation or including the granularity information in some global header field, such as PPS or SPS, applicable to the coded picture representation.

The address information generator 130 preferably employs the hierarchical granularity determined by the granularity determiner 110 in order to determine the length of the address information and thereby the number of bits that the address information should contain.

In a particular embodiment, the address information generator 130 determines the coordinates of a LCU position within the picture and coordinates of a sub-LCU position within the LCU as previously disclosed herein. The address information could then comprise representations of the representations of these LCU and sub-LCU positions or be determined therefrom.

The device 100 could be implemented at least partly in software. In such an embodiment, the device 100 is implemented as a computer program product stored on a memory and loaded and run on a general purpose or specially adapted computer, processor or microprocessor, such as a central processing unit (CPU). The software includes computer program code elements or software code portions effectuating the operation of at least the granularity determiner 110, the representation generator 120, the address information generator 130 and the representation manager 140. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the device 100 include single instruction multiple data (SIMD) code.

Alternatively the device 100 can be implemented in hardware. There are numerous variants of circuitry elements that can be used and combined to achieve the functions of the units of the device 100. Such variants are encompassed by the embodiments. Particular examples of hardware implementation of the device 100 is implementation in digital signal processor (DSP) hardware and integrated circuit technology, including both general-purpose electronic circuitry and application-specific circuitry.

Figure 11:
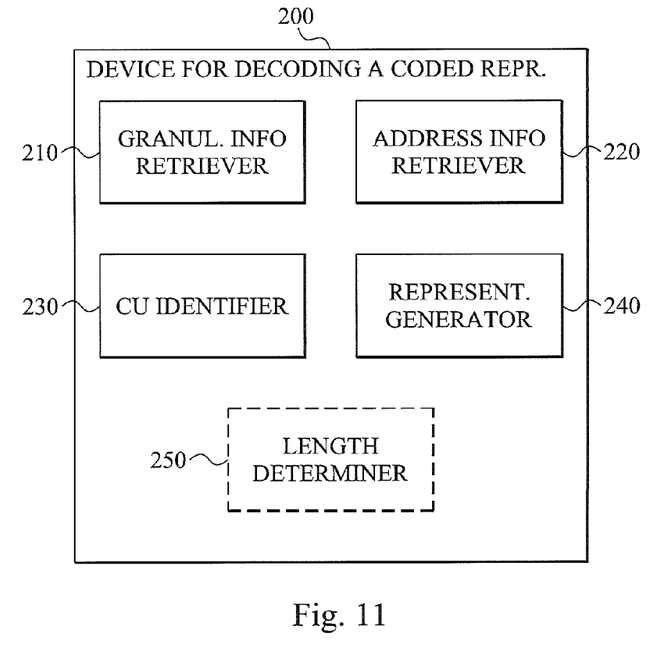

FIG. 11 is a schematic block diagram of an embodiment of a decoder or device 200 for decoding a coded representation of a picture comprising multiple slices and being composed of multiple LCUs. The device 200 comprises a granularity information retriever configured to retrieve information of the hierarchical granularity applicable to a present slice to be decoded. The granularity information retriever 210 could retrieve the granularity information from the coded picture representation or from a global header field, such as PPS or SPS field, associated with the coded picture representation. The granularity information retrieved by the granularity information retriever 210 is employed by an address information retriever 220 in order to retrieve address information from the coded picture representation. In a particular embodiment, the address information retriever 220 activates an optional length determiner 250 that is configured to determine the length of the address information based on the granularity information. Alternatively, this length determiner 250 can be omitted and the address information retriever 220 itself determines the address length based on the granularity information.

Once the address information retriever 220 has concluded the number of bits of the coded picture representation to read to get the address information, the retrieved address information is processed by a CU identifier 230 in order to identify a position of a first CU of the slice and thereby the position of the slice start within the picture. In a particular embodiment, the CU identifier 230 identifies the position of a LCU within the picture and within which the first CU and the slice start are position based on the address information. The CU identifier 230 additionally identifies a position of the first CU within the LCU based on the address information. In such a case, the address information could comprise respective representations of the LCU and sub-LCU coordinates or these coordinates are calculated from the address information as described in the foregoing.

The address information retriever 220 and the CU identifier 230 are preferably operable for each slice in the picture except for the first slice, which as a fixed known position in the slice. In such a case, the address information retriever 220 preferably first reads a slice flag included e.g. in the slice header of the current slice in the coded picture representation. If the slice flag has a defined value, such as one, the present slice is the first slice in the picture. In such a case, no address information needs to be retrieved by the address information retriever 220 and the CU identifier 230 does not need to identify the start position based on such address information. If the slice flag instead has another value, such as zero, the address information retriever 220 retrieves address information for the present slice from the coded picture representation.

A representation generator 240 of the device 200 generates a decoded representation of the pixel values of the pixels in the first CU and preferably of remaining CUs in the slice based on the coded picture representation. The representation generator 240 generates the pixel values according to known techniques, such as intra or inter mode decoding.

The representation generator 240 preferably determines the size of the first CU in terms of the number of pixels based at least partly on the address information. The address information then defines the size of the largest possible CU that can occupy the position defined by the address information in the picture. In an embodiment, the size of the first CU is determined by the representation generator 240 based solely on the address information. This is possible when the size of the first CU is equal to the SCU size and no further CU splitting is possible. In other embodiments, the representation generator 240 additionally uses one or more split coding unit flags included in the coded picture representation together with the address information to determine the size of the first CU. If a single split coding unit flag is equal $0_{bin}$ or some other defined value, the size of the first CU is equal to the size of the largest CU that can occupy the position within the picture defined by the address information. If the split coding unit flag is instead equal to one or some other defined value, the size of the first CU is smaller than, preferably one quarter of, the size of the largest possible CU that can occupy the position within the picture defined by the address information.

For instance, if the size of the largest possible CU at the starting coordinate is 32×32 pixels (with a LCU size of 64×64 pixels and a SCU size of 8×8 pixels) the split coding unit flag(s) would be:

split_coding_unit flag=0
for a 32×32 pixels size of the first CU
split_coding_unit_flag=1
split_coding_unit_flag=0
for a 16×16 pixels size of the first CU
split_coding_unit_flag=1
split_coding_unit_flag=1
for an 8×8 pixels size of the first CU The device 200 could be implemented at least partly in software. In such an embodiment, the device 200 is implemented as a computer program product stored on a memory and loaded and run on a general purpose or specially adapted computer, processor or microprocessor, such as a central processing unit (CPU). The software includes computer program code elements or software code portions effectuating the operation of at least the granularity information retriever 210, the address information retriever 220, the CU identifier 230 and the representation generator 240. Computer program code elements effectuating the operation of the length determiner 250 may also be included in the software. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the device 200 include single instruction multiple data (SIMD) code.

Alternatively the device 200 can be implemented in hardware. There are numerous variants of circuitry elements that can be used and combined to achieve the functions of the units of the device 100. Such variants are encompassed by the embodiments. Particular examples of hardware implementation of the device 200 is implementation in digital signal processor (DSP) hardware and integrated circuit technology, including both general-purpose electronic circuitry and application-specific circuitry.

Figure 12:
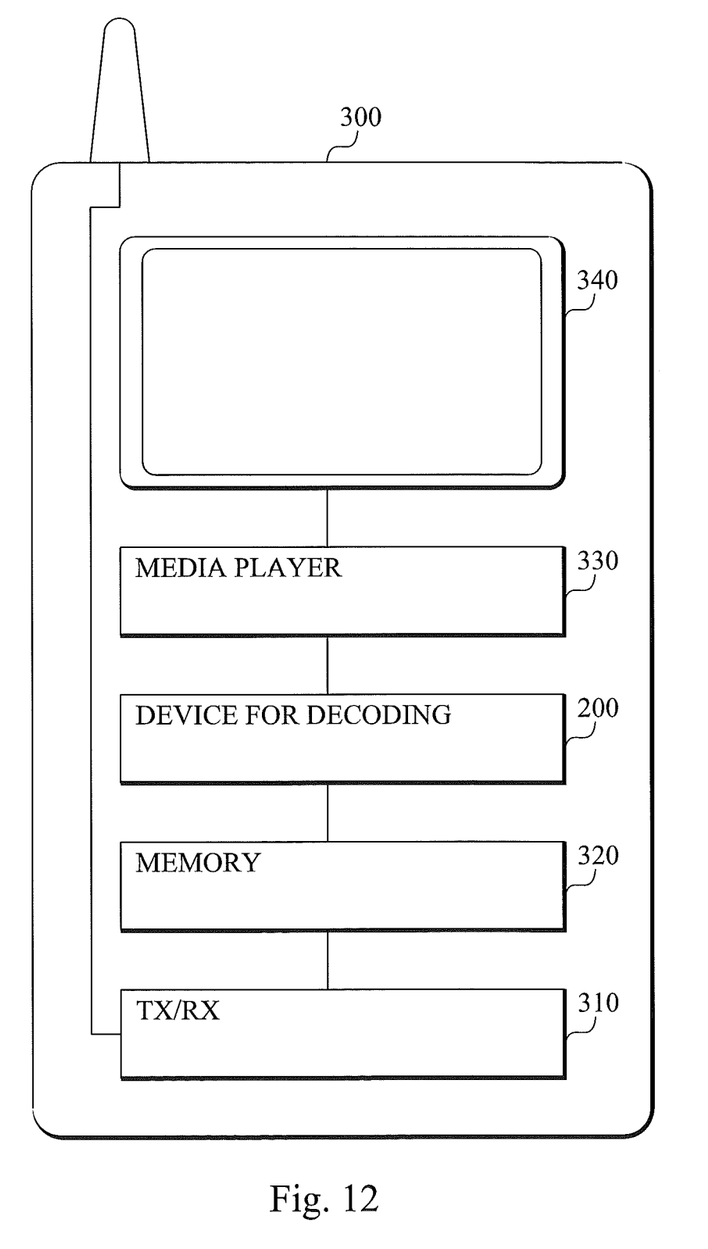

FIG. 12 is a schematic block diagram of a media terminal 300 housing a device 200 for decoding a coded representation of a picture. The media terminal 300 can be any device having media decoding functions that operates on an encoded bit stream, such as a video stream of encoded video frames to thereby decode the video frames and make the video data available. Non-limiting examples of such devices include mobile telephones and other portable media players, computers, decoders, game consoles, etc. The media terminal 300 comprises a memory 320 configured to a coded representation of a picture, such as encoded video frames. The coded representation can have been generated by the media terminal 300 itself. In such a case, the media terminal 300 preferably comprises a media engine or recorder together with a connected encoder, such as the device for coding a picture of FIG. 10. Alternatively, the coded representations are generated by some other device and wirelessly transmitted or transmitted by wire to the media terminal 300. The media terminal 300 then comprises a transceiver 310 (transmitter and receiver) or input and output port to achieve the data transfer.

The coded representation is brought from the memory 320 to the device 200 for decoding, such as the device illustrated in FIG. 11. The device 200 then decodes the coded representation into a decoded picture or as decoded video frames. The decoded data is provided to a media player 330 that is configured to render the decoded picture data or video frames into data that is displayable on a display or screen 340 of or connected to the media terminal 300.

In FIG. 12, the media terminal 300 has been illustrated as comprising both the device 200 for decoding and the media player 330. This should, however, merely be seen as an illustrative but non-limiting example of an implementation embodiment for the media terminal 300. Also distributed implementations are possible where the device 200 and the media player 330 are provided in two physically separated devices are possible and within the scope of media terminal 300 as used herein. The display 340 could also be provided as a separate device connected to the media terminal 300, where the actual data processing is taking place.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of coding a picture comprising multiple slices and being composed of multiple largest coding units having a selected size in terms of number of pixels, said method comprises:
   determining a hierarchical granularity for said picture defining a hierarchical level for slice border alignment, said hierarchical level defining a size of a smallest possible addressable coding unit at which a start of a slice in said picture can be aligned, said multiple largest coding units can be hierarchically split into multiple coding units having respective sizes that are smaller than said selected size;
   generating, for at least a portion of said multiple slices and based on said hierarchical granularity, address information identifying a respective first coding unit of said at least a portion of said multiple slices within said picture, wherein generating said address information comprises generating, for each slice of said multiple slices except a first slice in said picture and based on said hierarchical granularity, said address information identifying a respective first coding unit of said each slice of said multiple slices except said first slice;
   generating a respective coded slice representation of each slice of said multiple slices;
   including said respective coded slice representation and said address information in a coded picture representation of said picture; and
   associating said information of said hierarchical granularity to said coded picture representation.

2. The method according to claim 1, wherein associating said information of said hierarchical granularity comprising including said information of said hierarchical granularity in said coded picture representation.

3. The method according to claim 1, wherein including said information of said hierarchical granularity in said coded picture representation comprises including said information of said hierarchical granularity in a picture parameter set associated with said coded picture representation applicable to said multiple slices.

4. The method according to claim 1, further comprising determining, for said at least a portion of said multiple slices, the length of said address information based on said hierarchical granularity, wherein generating said address information comprises generating, for said at least a portion of said multiple slices, said address information based on said length of said address information.

5. The method according to claim 1, further comprising:
determining, for said at least a portion of said multiple slices, the coordinates of a position of a largest coding unit within said picture; and
determining, for said at least a portion of said multiple slices, the coordinates of a position of said first coding unit within said largest coding unit, wherein generating said address information comprises generating said address information based on said coordinates of said position of said largest coding unit, said coordinates of said position of said first coding unit and said hierarchical granularity.

6. A method of decoding a coded picture representation of a picture comprising multiple slices and being composed of multiple largest coding units having a selected size in terms of number of pixels, said method comprises:
retrieving information of a hierarchical granularity associated said coded picture presentation, said hierarchical granularity defining a hierarchical level for slice border alignment, said hierarchical level defining a size of a smallest possible addressable coding unit at which a start of a slice in said picture can be aligned, said multiple largest coding units can be hierarchically split into multiple coding units having respective sizes that are smaller than said selected size;
retrieving address information from said coded picture representation based on said information of said hierarchical granularity, said address information identifying a first coding unit of each slice of said multiple slices except a first slice in said picture;
identifying, based on said address information, a position of a first coding unit of a slice within said picture except for said first slice in said picture; and
generating a decoded representation of pixel values of the pixels in said first coding unit based on said coded picture representation.

7. The method of claim 6, wherein retrieving information of said hierarchical granularity comprises retrieving said information of said hierarchical granularity from said coded picture presentation.

8. The method according to claim 6, further comprising determining a length of said address information based on said hierarchical granularity, wherein retrieving said address information comprises retrieving said address information from said coded picture representation based on said length of said address information.

9. The method according to claim 6, wherein identifying said position of said first coding unit comprises:
identifying a position of a largest coding unit within said picture based on said address information; and
identifying a position of said first coding unit within said largest coding unit based on said address information.

10. A device for coding a picture comprising multiple slices and being composed of multiple largest coding units having a selected size in terms of number of pixels, said device comprises:
a granularity determiner configured to determine a hierarchical granularity for said picture defining a hierarchical level for slice border alignment, said hierarchical level defining a size of a smallest possible addressable coding unit at which a start of a slice in said picture can be aligned, said multiple largest coding units can be hierarchically split into multiple coding units having respective sizes that are smaller than said selected size;
a representation generator configured to generate a respective coded slice representation of each slice of said multiple slices;
an address information generator configured to generate, for at least a portion of said multiple slices and based on said hierarchical granularity, address information identifying a respective first coding unit of said at least a portion of said multiple slices within said picture, wherein said address information generator is configured to generate, for each slice of said multiple slices except a first slice in said picture and based on said hierarchical granularity, address information identifying a respective first coding unit of said each slice of said multiple slices except said first slice; and
a representation manager configured to include said respective coded slice representation and said address information in a coded picture representation of said picture and associate information of said hierarchical granularity to said coded picture representation.

11. The device according to claim 10, wherein said representation manager is configured to include said information of said hierarchical granularity in said coded picture representation.

12. The device according to claim 10, wherein said representation manager is configured to include said information of said hierarchical granularity in a picture parameter set associated with said coded picture representation applicable to said multiple slices.

13. The device according to claim 10, wherein said address information generator is configured to determine, for said at least a portion of said multiple slices, the length of said address information based on said hierarchical granularity.

14. The device according to claim 10, wherein said address information generator is configured to:
i) determine, for said at least a portion of said multiple slices, the coordinates of a position of a largest coding unit within said picture,
ii) determine, for said at least a portion of said multiple slices, the coordinates of a position of said first coding unit within said largest coding unit, and
iii) generate said address information based on said coordinates of said position of said largest coding unit, said coordinates of said position of said first coding unit and said hierarchical granularity.

15. A device for decoding a coded picture representation of a picture comprising multiple slices and being composed of multiple largest coding units having a selected size in terms of number of pixels, said device comprises:
a granularity information retriever configured to retrieve information of a hierarchical granularity associated with said coded picture presentation, said hierarchical granularity defining a hierarchical level for slice border alignment, said hierarchical level defining a size of a smallest possible addressable coding unit at which a start of a slice in said picture can be aligned, said multiple largest coding units can be hierarchically split into multiple coding units having respective sizes that are smaller than said selected size;

an address information retriever configured to retrieve address information from said coded picture representation based on said information of said hierarchical granularity, said address information identifying a first coding unit of each slice of said multiple slices except a first slice in said picture;

a coding unit identifier configured to identify, based on said address information, a position of a first coding unit of a slice within said picture except for said first slice in said picture; and a representation generator configured to generate a decoded representation of pixel values of the pixels in said first coding unit based on said coded picture representation.

16. The device according to claim 15, wherein said granularity information retriever is configured to retrieve said information of said hierarchical granularity from said coded picture representation.

17. The device according to claim 15, further comprising a length determiner configured to determine a length of said address information based on said hierarchical granularity, wherein said address information retriever is configured to retrieve said address information from said coded picture representation based on said length of said address information.

18. The device according to claim 15, wherein said coding unit identifier is configured to i) identify a position of a largest coding unit within said picture based on said address information, and ii) identify a position of said first coding unit within said largest coding unit based on said address information.

19. A media terminal comprising:

a memory storing a coded representation of a picture comprising multiple slices and being composed of multiple largest coding units having a selected size in terms of number of pixels; and a device for decoding said coded representation according to claim 15.

* * * * *

UNITED STATES PATENT AND TRADEMARK OFFICE
CERTIFICATE OF CORRECTION

PATENT NO. : 8,861,615 B2  Page 1 of 1
APPLICATION NO. : 13/144359
DATED : October 14, 2014
INVENTOR(S) : Sjoberg et al.

It is certified that error appears in the above-identified patent and that said Letters Patent is hereby corrected as shown below:

In the Specification

In Column 5, Line 21, delete "i.e," and insert -- i.e. --, therefor.

In Column 7, Line 23, delete "an," and insert -- an --, therefor.

In Column 11, Line 12, delete "(log2_diff_max_min_coding_block_size<<1))" and insert -- (log2_diff_max_min_coding_block_size<<1))+ --, therefor.

In Column 11, Line 24, delete "C+1-2P." and insert -- $C+1-2^P$. --, therefor.

In Column 12, Line 1, delete "CU" and insert -- CU // --, therefor.

In Column 12, Line 7, delete "CU" and insert -- CU // --, therefor.

In Column 13, Line 27, delete "needed," and insert -- needed. --, therefor.

Signed and Sealed this
Twelfth Day of May, 2015

Michelle K. Lee
*Director of the United States Patent and Trademark Office*